United States Patent
Millman

(10) Patent No.: US 10,296,013 B2
(45) Date of Patent: May 21, 2019

(54) VEHICLE GUIDANCE SYSTEM AND METHOD THAT USES AIR DATA FROM SURFACE-MOUNTED PRESSURE SENSORS FOR VEHICLE ORIENTATION CONTROL

(71) Applicant: BOOZ ALLEN HAMILTON, McLean, VA (US)

(72) Inventor: Daniel R. Millman, Houston, TX (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 25 days.

(21) Appl. No.: 15/155,673

(22) Filed: May 16, 2016

(65) Prior Publication Data
US 2017/0329350 A1 Nov. 16, 2017

(51) Int. Cl.
G05D 1/08 (2006.01)
B64C 13/18 (2006.01)
B64D 43/02 (2006.01)
G01L 19/00 (2006.01)

(52) U.S. Cl.
CPC ........... G05D 1/0808 (2013.01); B64C 13/18 (2013.01); B64D 43/02 (2013.01); G01L 19/0084 (2013.01)

(58) Field of Classification Search
CPC ...... G05D 1/0808; B64C 13/18; B64D 43/02; G01L 19/0084
See application file for complete search history.

(56) References Cited

U.S. PATENT DOCUMENTS

| | | | | |
|---|---|---|---|---|
| 5,435,503 A | * | 7/1995 | Johnson, Jr. | F41G 7/008 244/3.15 |
| 5,616,861 A | * | 4/1997 | Hagen | G01P 5/14 73/170.02 |
| 6,253,166 B1 | * | 6/2001 | Whitmore | G01P 13/025 700/89 |
| 6,550,344 B2 | * | 4/2003 | Bachinski | G01P 5/16 73/861.05 |

(Continued)

OTHER PUBLICATIONS

Joel C. Ellsworth et al., "Simulation of a Flush Air-Data System for Transatmospheric Vehicles", Journal of Spacecraft and Rockets, vol. 45, No. 4, Jul.-Aug. 2008, pp. 716-732.

(Continued)

*Primary Examiner* — Thomas E Worden
(74) *Attorney, Agent, or Firm* — Buchanan Ingersoll & Rooney PC

(57) ABSTRACT

A vehicle guidance system, including: surface-mounted pressure sensors mounted on a vehicle; an air data estimation controller including: a preprocessor that sets initial values for angle of attack and sideslip angle, determines a converged value for the angle of attack using the initial values and values of one or more first sets of three sensors, each first set of sensors are located among three different planes that are parallel to the ground, and provides a converged sideslip angle value based on the converged value and values of one or more second sets of three sensors, each second set of sensors located among three different planes that are perpendicular to the ground; a processor that estimates air data based on the converged value for the angle of attack and the converged sideslip angle value; and processor that provides an output for adjusting orientation of a vehicle based on the air data.

20 Claims, 7 Drawing Sheets

(56) References Cited

U.S. PATENT DOCUMENTS

| | | | | |
|---|---|---|---|---|
| 2002/0162401 | A1* | 11/2002 | Bachinski | G01N 3/32 73/812 |
| 2003/0115948 | A1* | 6/2003 | Rouse | G01P 5/14 73/170.02 |
| 2005/0090947 | A1* | 4/2005 | Wise | G01P 13/025 701/6 |
| 2007/0098550 | A1* | 5/2007 | Collot | B64D 43/02 416/61 |
| 2012/0041634 | A1* | 2/2012 | Madhavanpillai | G01P 5/16 701/30.1 |
| 2012/0298801 | A1* | 11/2012 | Ellison | B64D 43/02 244/129.1 |
| 2014/0230539 | A1* | 8/2014 | Perju | G01P 13/025 73/180 |
| 2015/0142254 | A1* | 5/2015 | Madhavanpillai | G01P 5/16 701/30.6 |
| 2015/0219512 | A1* | 8/2015 | Bruti | G01P 13/025 701/14 |
| 2016/0266164 | A1* | 9/2016 | Ellison | B64D 43/02 |
| 2016/0325844 | A1* | 11/2016 | Mehlen | G01P 5/16 |
| 2016/0325845 | A1* | 11/2016 | Mehlen | G01P 5/16 |
| 2018/0118370 | A1* | 5/2018 | Millman | B64C 13/18 |

OTHER PUBLICATIONS

Christopher D. Karlgaard et al., "MARS Entry Atmospheric Data System Trajectory Reconstruction Algorithms and Flight Results", 51$^{st}$ AIAAA Aerospace Sciences Meeting including the New Horizons Forum and Aerospace Exposition, American Institute of Aeronautics and Astronautics, Jan. 7-10, 2013, pp. 1-27.

Brent R. Cobleigh et al., "Flush Airdata Sensing (FADS) System Calibration Procedures and Results for Blunt Forebodies", NASA/TP-1999-209012, National Aeronautics and Space Administration, Nov. 1999, pp. 1-27.

Susanne Weiss et al., "Comparing Three Algorithms for Modeling Flush Air Data Systems", 40$^{th}$ Aerospace Science Meeting & Exhibit, Jan. 14-17, 2002, AIAAA 2002-0535, pp. 1-10.

Dutta et al., "Cramer-Rao Lower Bound Optimization of Flush Atmospheric Data Systems Sensor Placement," Journal of Spacecraft and Rockets, vol. 51, No. 6, pp. 1773-1788, Nov.-Dec. 2014.

* cited by examiner

VEHICLE GUIDANCE SYSTEM AND METHOD THAT USES AIR DATA FROM SURFACE-MOUNTED PRESSURE SENSORS FOR VEHICLE ORIENTATION CONTROL

FIELD

The present disclosure relates to a vehicle guidance system and method that uses air data from surface-mounted pressure sensors to provide an output for adjusting orientation of a vehicle.

BACKGROUND

U.S. Pat. No. 6,253,166 entitled "Stable Algorithm for Estimating Airdata from Flush Surface Pressure Measurements" by Stephen A. Whitmore et al. describes a flush air data sensing (FADS) system for estimating air data using nonintrusive surface pressure measurements from a vehicle surface. U.S. Pat. No. 6,253,166 describes transforming an air flow model by strategically taking differences from outputs of three surface pressure sensors, known as triples. This triples formulation is then used to estimate and compute air data for air surrounding a flight vehicle from the surface pressure measurements. Accurate air data (e.g., Mach number, dynamic pressure, angle of attack, angle of sideslip, surface winds, airspeed, altitude, etc.) can help ensure efficient and safe flight. U.S. Pat. No. 6,253,166 describes six sensors located on a nose of a flight vehicle. An angle of attack is decoupled from an angle of sideslip by using specific locations of pressure sensors aligned along the vertical meridian of the nose.

A paper entitled "Simulation of a Flush Air-Data System for Transatmospheric Vehicles" in the Journal of Spacecraft and Rockets, Vol. 45, No. 4, July-August 2008, by Joel C. Ellsworth et al. describes a FADS system based on the X-34 outer mold line.

A paper entitled "Mars Entry Atmospheric Data System Trajectory Reconstruction Algorithms and Flight Results" by Christopher D. Karlgaard et al. from the 51$^{st}$ AIAA Aerospace Sciences Meeting including the New Horizons Forum and Aerospace Exposition on Jan. 7-10, 2013 describes a system of seven pressure transducers linked to ports on the entry vehicle forebody to record pressure distribution during atmospheric entry. The measured surface pressures are used to generate estimates of atmospheric quantities based on modeled surface pressure distributions.

A paper entitled "Flush Airdata Sensing (FADS) System Calibration Procedures and Results for Blunt Forebodies," by Brent R. Cobleigh et al., American Institute of Aeronautics and Astronautics, Inc., 1999, describes using blunt-forebody pressure data to study behavior of NASA Dryden Flight Research Center FADS pressure model and solution algorithm.

A paper entitled "Comparing Three Algorithms for Modeling Flush Air Data Systems" by Susanne Weiss from the 40$^{th}$ AIAA Aerospace Sciences Meeting and Exhibit on Jan. 14-17, 2002 describes a FADS system mounted on a modified centerline tank of an F-4 Phantom. This document compares a weighted least squares solution to a triples-based solution and a five-hole probe method. The contents of the foregoing documents are hereby incorporated by reference herein in their entireties.

SUMMARY

An exemplary embodiment of the present disclosure provides a vehicle guidance system, including: at least four surface-mounted pressure sensors configured to be mounted on a vehicle, each sensor being configured to detect a surface pressure distribution for a location of each such sensor when placed on a vehicle; an air data estimation controller connected to each of the plurality of surface-mounted pressure sensors. The air data estimation controller including: a preprocessor configured to set an initial value for angle of attack and set an initial value for sideslip angle, and determine a converged value for the angle of attack using the initial value for angle of attack, the initial value for sideslip angle, and surface pressure distribution values of one or more first sets of three surface-mounted pressure sensors, each first set of three surface-mounted pressure sensors are located among three different geometric planes that are parallel to the ground, the preprocessor being configured to provide a converged sideslip angle value based on the converged value for the angle of attack and surface pressure distribution values of one or more second sets of three surface-mounted pressure sensors, each second set of three-surface mounted pressure sensors are located among three different geometric planes that are perpendicular to the ground, wherein the first and second sets of pressure sensors differ by at least one pressure sensor; and an air data processor configured to estimate air data parameters based on the converged value for the angle of attack and the converged sideslip angle value. The air data estimation controller also includes a flight control processor configured to provide an output for adjusting an orientation of a vehicle based on the estimated air data parameters.

An exemplary embodiment of the present disclosure provides a method for guiding a vehicle that includes at least four surface-mounted pressure sensors mounted on the vehicle and an air data estimation controller connected to each of the plurality of surface-mounted pressure sensors, wherein the air data estimation controller includes a preprocessor and an air data processor. The method includes: detecting, by each sensor, a surface pressure distribution for a location of each such sensor on the vehicle; setting, by the preprocessor, an initial value for angle of attack of the vehicle and an initial value for sideslip angle of the vehicle; receiving, in the preprocessor, surface pressure distribution values of one or more first sets of three surface-mounted pressure sensors, each first set of three-surface mounted pressure sensors are located among three different geometric planes that are parallel to the ground; determining, by the preprocessor, a converged value for the angle of attack using the initial value for angle of attack, the initial value for sideslip angle, and the surface pressure distribution values of the one or more first sets of three surface-mounted pressure sensors; receiving, in the preprocessor, surface pressure distribution values of one or more second sets of three surface-mounted pressure sensors that are located among three different geometric planes that are perpendicular to the ground, wherein the first and second sets of pressure sensors differ by at least one pressure sensor; determining, by the preprocessor, a converged sideslip angle value based on the converged value for the angle of attack and the surface pressure distribution values of the one or more second sets of three surface-mounted pressure sensors; outputting the converged value for the angle of attack and the converged sideslip angle value from the preprocessor to the air data processor; estimating, by the air data processor, air data parameters based on the converged value for the angle of attack and the converged sideslip angle value; outputting the estimated air data parameters from the air data processor to a flight control processor; and providing, from the flight control processor, an output for adjusting an orientation of the vehicle based on the estimated air data parameters to a vehicle control system.

BRIEF DESCRIPTION OF THE DRAWINGS

The scope of the present disclosure is best understood from the following detailed description of exemplary embodiments when read in conjunction with the accompanying drawings, wherein.

DETAILED DESCRIPTION

The nomenclature below is used throughout the present disclosure.

Nomenclature

| | |
|---|---|
| A, B, C, D, E | Coefficients for the angle of attack and sideslip angle computations |
| a, b, c | Coefficients for the angle of attack computations |
| $c_0, c_1, c_2, c_3, c_4$ | Coefficients for the angle of attack computations |
| $\hat{c}_0, \hat{c}_1, \hat{c}_2$ | Coefficients for sideslip angle computations |
| f | trigonometric polynomial in $\alpha$ |
| df/d$\alpha$ | derivative of the trigonometric polynomial in $\alpha$ |
| M | Mach number |
| p | pressure |
| P | pressure differences |
| $\bar{q}$ | dynamic pressure |
| $q_c$ | compressible dynamic pressure |
| r | position vector, normal to the body surface |
| V | velocity vector |
| u, v, w | x-, y-, and z-components of the velocity vector |
| x, y, z | Cartesian coordinates in the body axes |
| $\alpha$ | angle of attack |
| $\alpha_1, \alpha_2$ | guess and new values of the angle of attack |
| $\beta$ | sideslip angle |
| $\beta_1, \beta_2$ | two roots of the quadratic equation for the sideslip angle |
| $\gamma$ | ratio of specific heats |
| $\in$ | tolerance value |
| $\varepsilon$ | calibration parameter |
| $\lambda$ | cone angle |
| $\phi$ | clock angle |
| $\theta$ | total inclination angle |

Superscripts and Subscripts

| | |
|---|---|
| i, j, k | pressure sensor locations |
| ik, ji, kj | indicates which pressure sensors are differenced |
| n, n + 1 | iterates |
| $\infty$ | freestream conditions |

Figure 1:
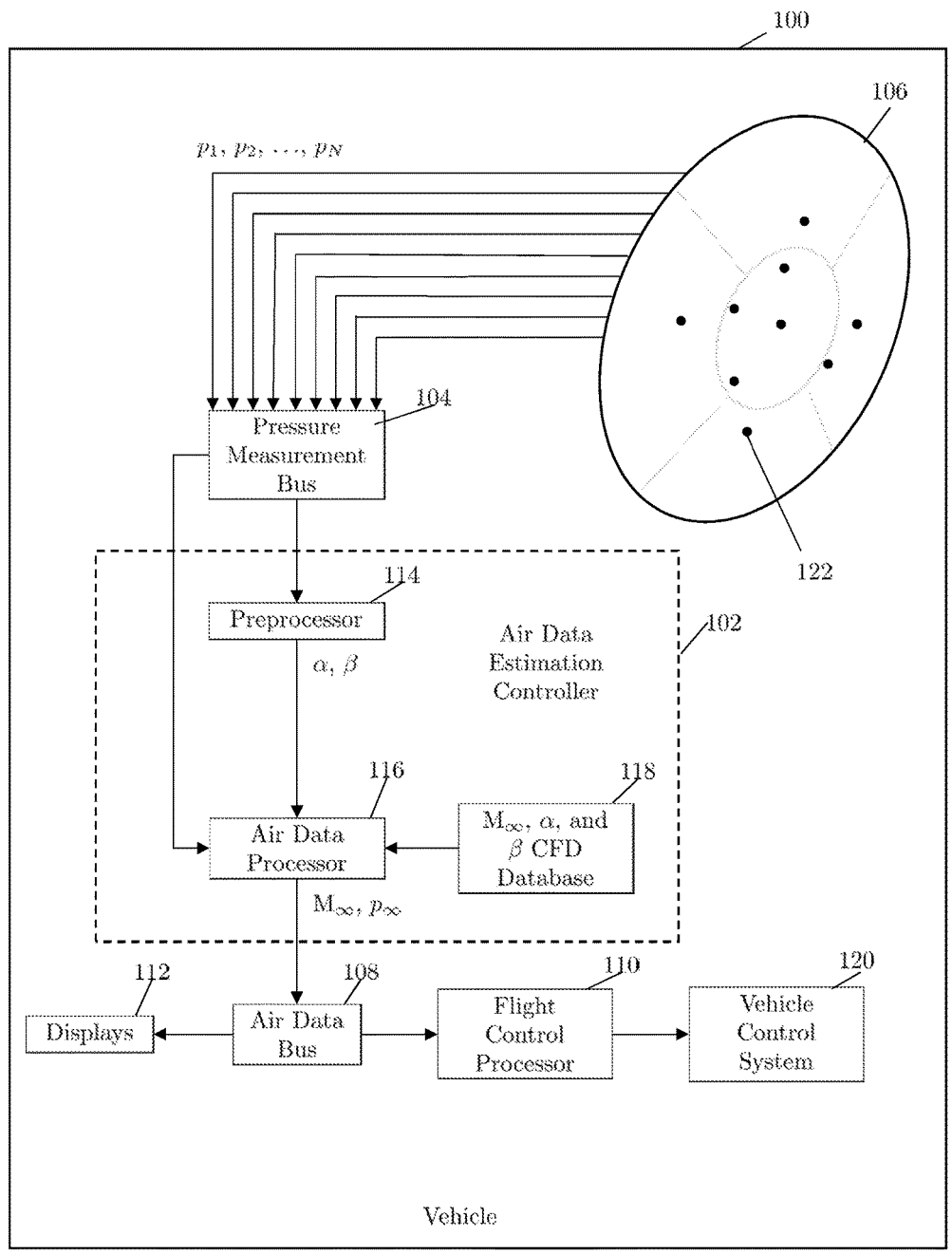
FIG. 1 is a block diagram illustrating a system hardware architecture in accordance with an exemplary embodiment.

FIG. 1 shows a vehicle guidance system for a vehicle 100 in accordance with an exemplary embodiment. In an exemplary embodiment, the vehicle guidance system is a FADS system. The vehicle guidance system of the present disclosure allows for a real-time in-flight computation of flight parameters with greater flexibility of pressure sensor placement on a vehicle 100. The vehicle 100 can be, for example, an aircraft (e.g., airplane, jet, drone, etc.), spacecraft (e.g., space shuttle, etc.), missile, any other vehicle or device capable of flight, a submarine, any other vehicle or device capable of moving under water, etc. The vehicle guidance system includes at least four surface-mounted pressure sensors 122 configured to be mounted on a vehicle 100, each sensor 122 being configured to detect a surface pressure distribution $p_1, p_2, \ldots, p_N$ for a location of each such sensor 122 when placed on a vehicle 100. The vehicle guidance system provides flexibility in the placement of the surface-mounted pressure sensors 122 as they do not need to be aligned along the vertical meridian of the nose or heat shield of the vehicle as explained below.

Figure 2:
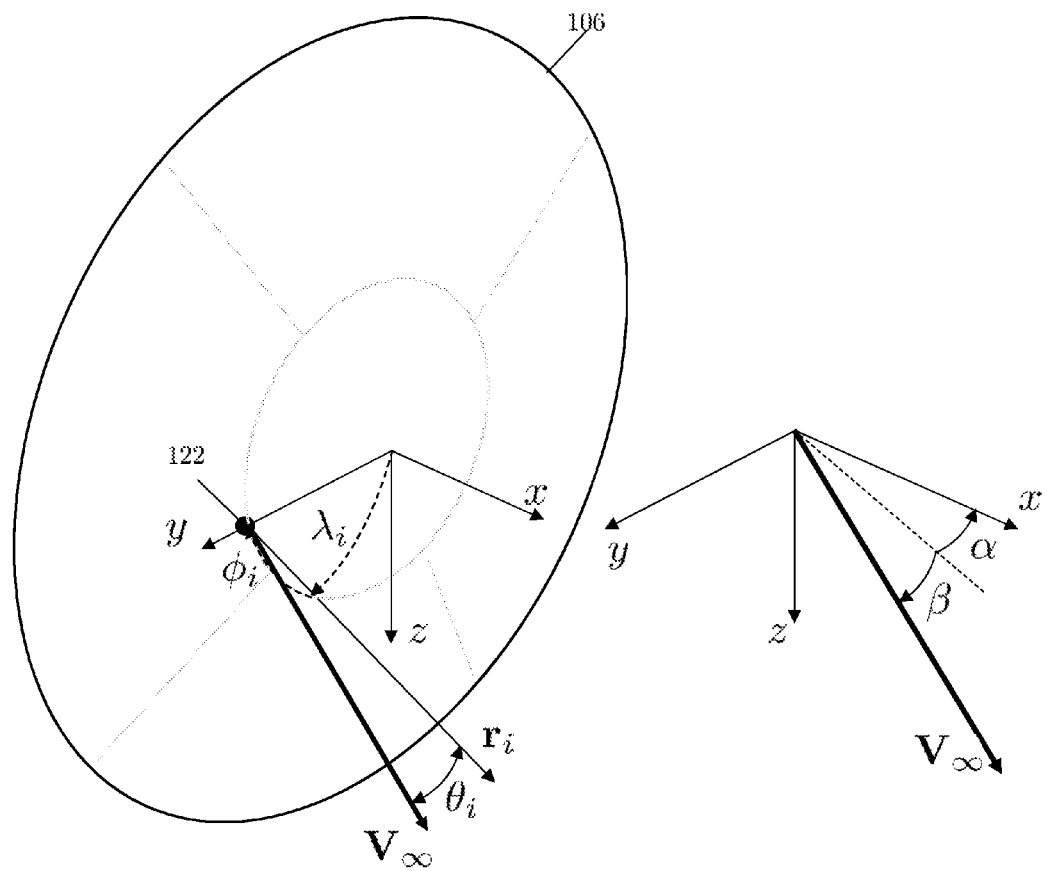
FIG. 2 is illustrates a portion of a vehicle body in accordance with an exemplary embodiment.

FIG. 2 shows the geometry of the vehicle guidance system. The hemispherical surface can be a portion of the vehicle body 106 which can be, for example, the nose of the vehicle 100, heat shield of a re-entry capsule, or any other portion of the vehicle body. The x-axis, y-axis, and z-axis as discussed herein are defined as shown in FIG. 2. The present disclosure is not limited to this orientation of axes, and the axes could be tilted any number of degrees in any direction. The location of each surface-mounted pressure sensor 122 on the vehicle body (e.g., nose of an air vehicle) is referenced by the body axis which has the x-axis pointing forward through the nose of the vehicle 100, the z-axis pointing down toward the Earth, and the y-axis pointing out the right side of the vehicle 100 to complete the right-handed triad. For example, if the vehicle 100 was an airplane, the y-axis would be in the direction of the right wing. The clock angle subtends from the point of symmetry on the nose to the latitude of the surface-mounted pressure sensor 122. The clock angle begins at the bottom of the vehicle 100 on the plane of symmetry and moves in a clockwise fashion to the location of the surface-mounted pressure sensor 122. The wind axis is used to define the angle of attack $\alpha$ and the sideslip angle $\beta$. The sideslip angle $\beta$ is measure positive from the x-z plane, and is positive with a right-hand rotation about the z-axis. The angle of attack $\alpha$ is obtained in the x-z plane, and is measured positive with a right-hand rotation about the y-axis. That is, the angle of attack $\alpha$ is the angle measured from the velocity vector $V_\infty$, to a reference line on the vehicle (i.e. the x-axis in FIG.2). Any point on the hemispherical surface is described by two angles, the cone angle $\lambda_i$ and the clock angle $\Phi_i$. The radius vector $r_i$ of the $i^{th}$ surface-mounted pressure sensor 122 is given by $$r_i = \begin{pmatrix} x \cos \lambda_i \\ y \sin \phi_i \sin \lambda_i \\ z \cos \phi_i \sin \lambda_i \end{pmatrix}, \tag{1}$$

The velocity vector $V_\infty$ in the standard wind axis is also shown in FIG. 1 with reference to the angle of attack $\alpha$ and the sideslip angle $\beta$, and is given by $$V_\infty = \begin{pmatrix} u \cos \alpha \cos \beta \\ v \sin \beta \\ w \sin \alpha \cos \beta \end{pmatrix}, \tag{2}$$

where u, v, and w are the velocity components in the x, y, and the z directions, respectively. By taking the dot product of the two vectors and dividing by the magnitudes of the two vectors the cosine of the total inclination angle of the flow results $$\cos \theta_i = \cos \alpha \cos \beta \cos \lambda_i + \sin \beta \sin \phi_i \sin \lambda_i + \sin \alpha \cos \beta \cos \phi_i \sin \lambda_i \quad (3)$$

A pressure distribution over the hemispherical surface of the vehicle 100 (e.g., the nose cone, heat shield, etc.) is given by $$p_i = q_c(\cos^2 \theta_i + \varepsilon \sin^2 \theta_i) + p_\infty, \quad (4)$$

where $p_i$, is the pressure at the $i^{th}$ surface-mounted pressure sensor 122, $q_c$ is the compressible dynamic pressure, $p_\infty$ is the freestream pressure, and $\varepsilon$ is a calibration factor that is obtained from computational fluid dynamics (CFD) predictions, wind tunnel experiments, or a flight test. For a given number of surface-mounted pressure sensors 122, Equation (4) has four unknowns—$q_c$, $p_\infty$, $\alpha$, and $\beta$.

In FIG. 1, the vehicle guidance system includes an air data estimation controller 102 connected to each of the plurality of surface-mounted pressure sensors 122. Each of the plurality of surface-mounted pressure sensors 122 are connected to a pressure measurement bus 104. The air data estimation controller 102 includes a preprocessor 114 that computes an angle of attack $\alpha$ and a sideslip angle $\beta$. These flight angles are used in conjunction with data (e.g., a table, etc.) stored in a database 116 to determine the remaining air data properties, for example, freestream pressure, freestream Mach number, etc. The pressure measurement bus 104 is connected to the preprocessor 114, and the pressure measurement bus 104 outputs the surface pressure distribution value associated with each of the surface-mounted pressure sensors 122 to the preprocessor 114, the air data processor 116, or other subsystems of the air data estimation controller 102.

Figure 3:
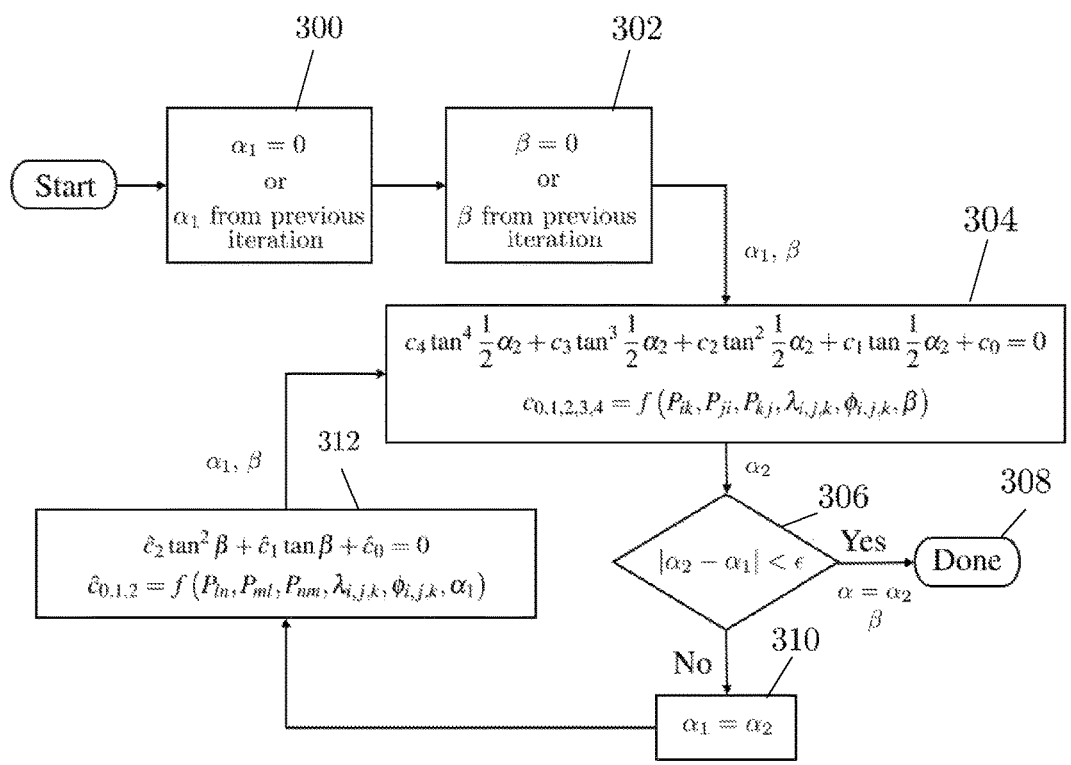
FIG. 3 is a flow chart illustrating a method according to an exemplary embodiment.

FIG. 3 illustrates an overview of steps performed by the preprocessor 114 in order to determine one or more angle of attack values a and one or more sideslip angles $\beta$. After the preprocessor 114 has determined one or more angle of attack values $\alpha$ and one or more sideslip angles $\beta$, the preprocessor 114 outputs one or more angle of attack values $\alpha$ and one or more sideslip angles $\beta$ as discussed below. In an exemplary embodiment, the preprocessor 114 is configured to set an initial value for angle of attack $\alpha_1$ and set an initial value for sideslip angle $\beta$ (see steps 300 and 302 of FIG. 3).

In an exemplary embodiment, the preprocessor 114 is configured to set the initial value for angle of attack $\alpha_1$ to zero and the initial value for sideslip angle $\beta$ to zero. Setting the initial value for the sideslip angle $\beta$ to zero is usually sufficient since the sideslip angle is typically small, but a value of a previous trajectory calculation speeds convergence of the sideslip angle. That is a previously determined value of the sideslip angle by the preprocessor 114 can be used as the initial value for the sideslip angle $\beta$. Also, a previously determined value of the angle of attack by the preprocessor 114 can be used as the initial value for the angle of attack $\alpha_1$.

Figure 4A:
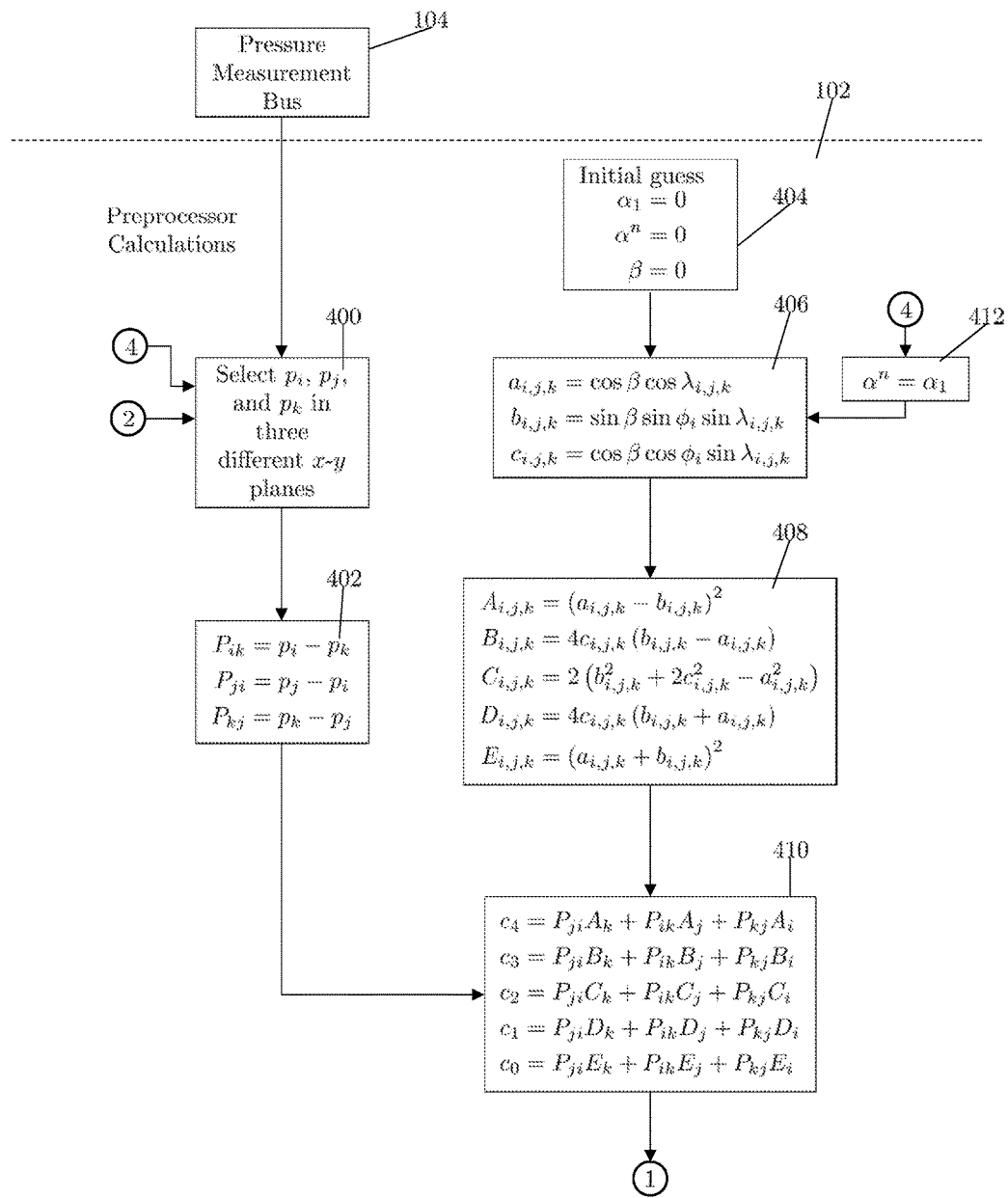
FIGS. 4A-4D are flow charts further illustrating the exemplary method of FIG. 3.
Figure 4B:
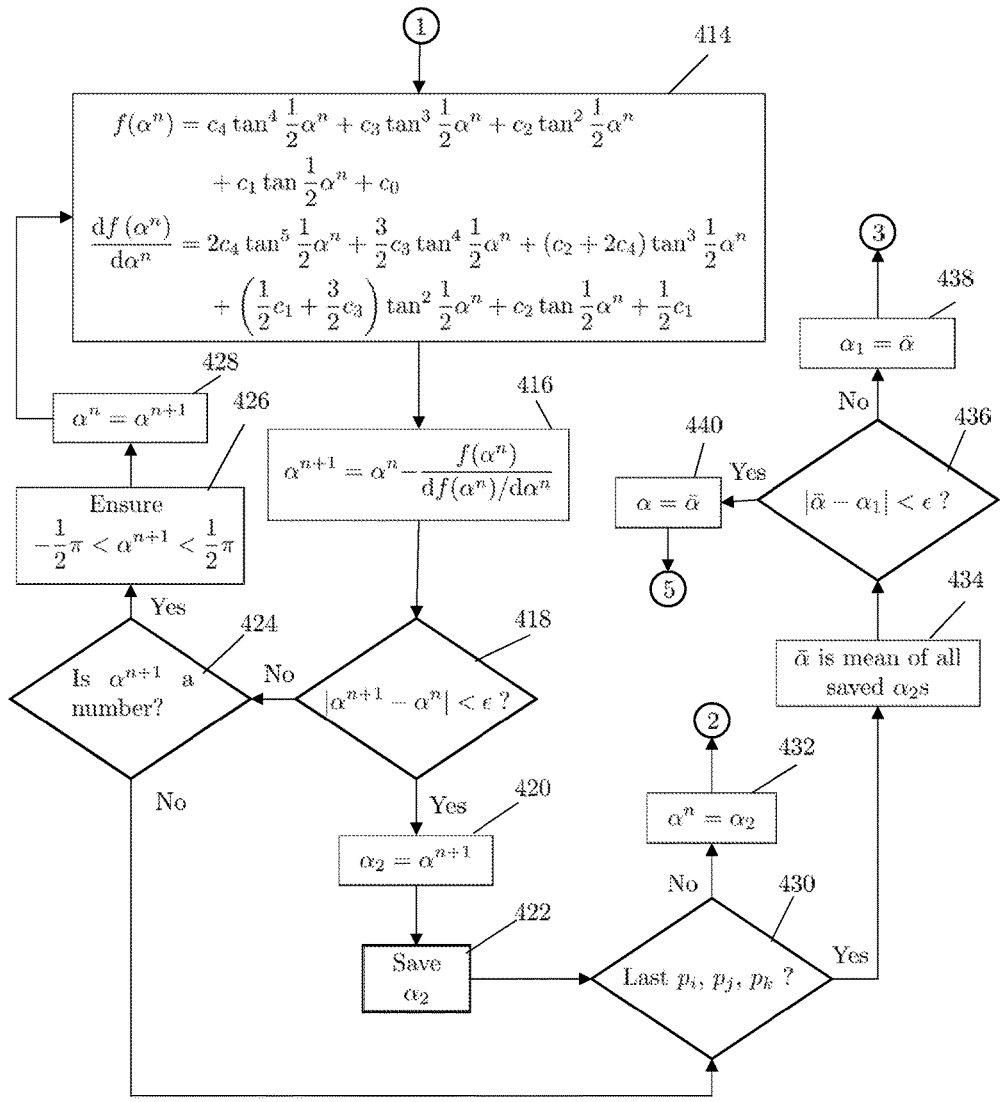

The preprocessor 114 is configured to determine a converged value for the angle of attack (e.g., $\alpha$ that is equal to $\bar{\alpha}$; see step 440 of FIG. 4B) using the initial value for angle of attack $\alpha_1$, the initial value for sideslip angle $\beta$, and surface pressure distribution values of one or more first sets of three surface-mounted pressure sensors 122, each first set of three-surface mounted pressure sensors are located among three different geometric planes that are parallel to the ground. In other words, the first set of three surface-mounted pressure sensors 122 are each located in different x-y planes (i.e., three different x-y planes), where the x-axis and y-axis are defined as shown in FIG. 2. In an exemplary embodiment, the first set of three surface-mounted pressure sensors 122 are located among two different geometric planes that are parallel to the ground.

In step 304 of FIG. 3, the coefficients of the fourth order trigonometric polynomial are computed with the initial value for the sideslip angle $\beta$, and a Newton-Raphson method is used to iterate for a new value of the angle of attack $\alpha_2$. In step 306, a check is performed to determine whether the initial value for angle of attack $\alpha_1$ and the new value for the angle of attack $\alpha_2$ has converged. In step 308, if the absolute value of the difference of $\alpha_1$ and $\alpha_2$ is less than $\varepsilon$ (a predetermined tolerance value), then the angle of attack and sideslip angle computations are done. If the determination of step 306 is not yes, the initial value for the angle of attack $\alpha_1$ is updated (step 310), and the value of the sideslip angle $\beta$ is updated from the new angle of attack value (step 312). The iterations continue until the angle of attack value converges (i.e., Yes in step 306 is obtained).

Figure 4C:
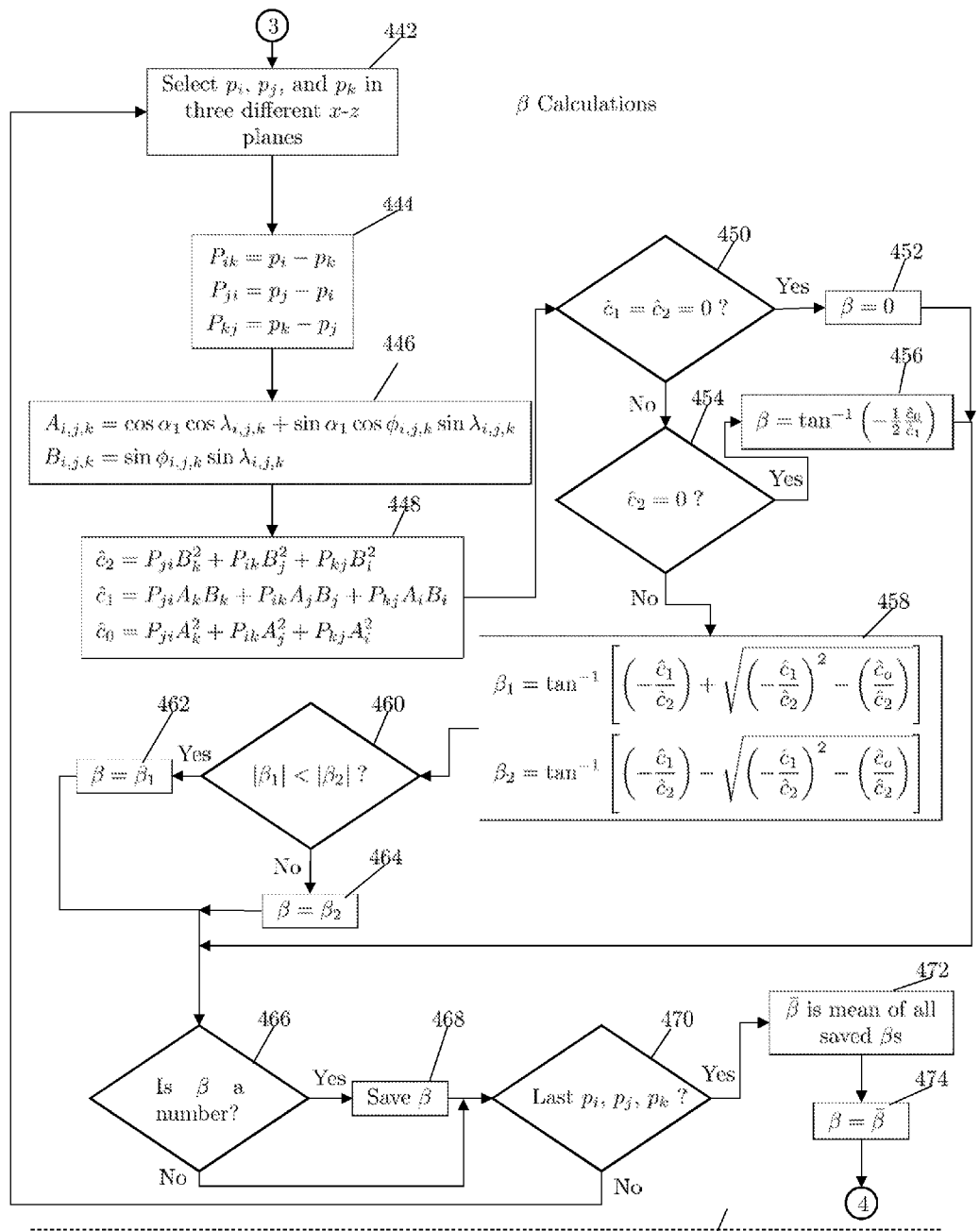

In FIG. 1, the preprocessor 114 is configured to provide (e.g., determine, calculate, etc.) a converged sideslip angle value (e.g., $\beta$ that is equal to $\bar{\beta}$; see step 474 of FIG. 4C) based on the converged value for the angle of attack and surface pressure distribution values of one or more second sets of three surface-mounted pressure sensors 122, each second set of three-surface mounted pressure sensors are located among three different geometric planes that are perpendicular to the ground. In other words, the second set of three surface-mounted pressure sensors 122 are each located in different x-z planes, where the x-axis and z-axis are defined as shown in FIG. 2. In an exemplary embodiment, the second set of three surface-mounted pressure sensors 122 are located among two different geometric planes that are perpendicular to the ground.

In an exemplary embodiment, the first and second sets of pressure sensors 122 differ by at least one pressure sensor 122.

In an exemplary embodiment, the converged value for the angle of attack is an average of angle of attack values previously determined by the preprocessor 114.

In an exemplary embodiment, the converged sideslip angle value is an average of sideslip angle values previously determined by the preprocessor 114.

In FIG. 1, the air data estimation controller 102 includes an air data processor 116 configured to estimate air data parameters based on the converged value for the angle of attack and the converged sideslip angle value. The air data processor 116 is connected to the preprocessor 114, and data can be transmitted between the air data processor 116 and the preprocessor 114. The data can include, for example, one or more angle of attack values and one or more values for sideslip angle. In an exemplary embodiment, the air data parameters can be one or more of: Mach number, dynamic pressure, angle of attack, angle of sideslip, surface winds, airspeed, altitude, etc.

In an exemplary embodiment, the air data estimation controller 102 can also include the database 118 that is connected to the air data processor 116. The database 118 can store, for example, one or more freestream Mach number $M_\infty$ values, one or more angle of attack values, one or more values for sideslip angle, etc.

The vehicle guidance system of FIG. 1 also includes a flight control processor 110 configured to provide an output for adjusting an orientation of a vehicle 100 based on the estimated air data parameters. In an exemplary embodiment, the output is a control signal that is in the appropriate format to control a vehicle control system 120 which can be any device that can adjust the orientation of a vehicle 100. FIG. 1 shows the vehicle control system 120 connected to the flight control processor 110. The vehicle control system 120 can be, for example, an aileron, rudder, elevator, wing, thruster, turbine, engine, propeller, etc. That is, the vehicle control system 120 is the actual physical device or physical devices that cause the orientation of the vehicle 100 to be changed. The flight control processor 110 can be connected to an air data bus 108 that is connected to the air data processor 116 and one or more displays 112. All air data values that are determined by the preprocessor 114 and the air data processor 116, including the flight angles (i.e., angle of attack and side slip angle), are sent to the air data bus 108 so they can be distributed to the one or more displays 112 and the flight control processor 110. The flight control processor 110 sends guidance, navigation, and control commands to the vehicle control system 120. The displays 112 can be operator displays, for example, vehicle instrument gauges, LCD screens, LED screens, touchscreens, or any other display that is capable of conveying air data information to a pilot or operator of a vehicle 100.

In an exemplary embodiment, the preprocessor 114 is configured to set the initial value for angle of attack to a value obtained from a previously converged angle of attack solution produced by the preprocessor 114 (for example, $\alpha_1$ from a previous iteration; see step 300 of FIG. 3) or an input to the preprocessor 114 that represents a predicted trajectory of a vehicle 100.

In an exemplary embodiment, the vehicle guidance system can be in combination with a vehicle 100 as shown in FIG. 1. The vehicle 100 includes a vehicle body 106 upon which the surface-mounted pressure sensors 122 are mounted.

In an exemplary embodiment, the vehicle includes the vehicle control system 120 that is configured to receive an output of the flight control processor 110 of the vehicle guidance system for altering orientation of the vehicle 100.

Figure 4D:
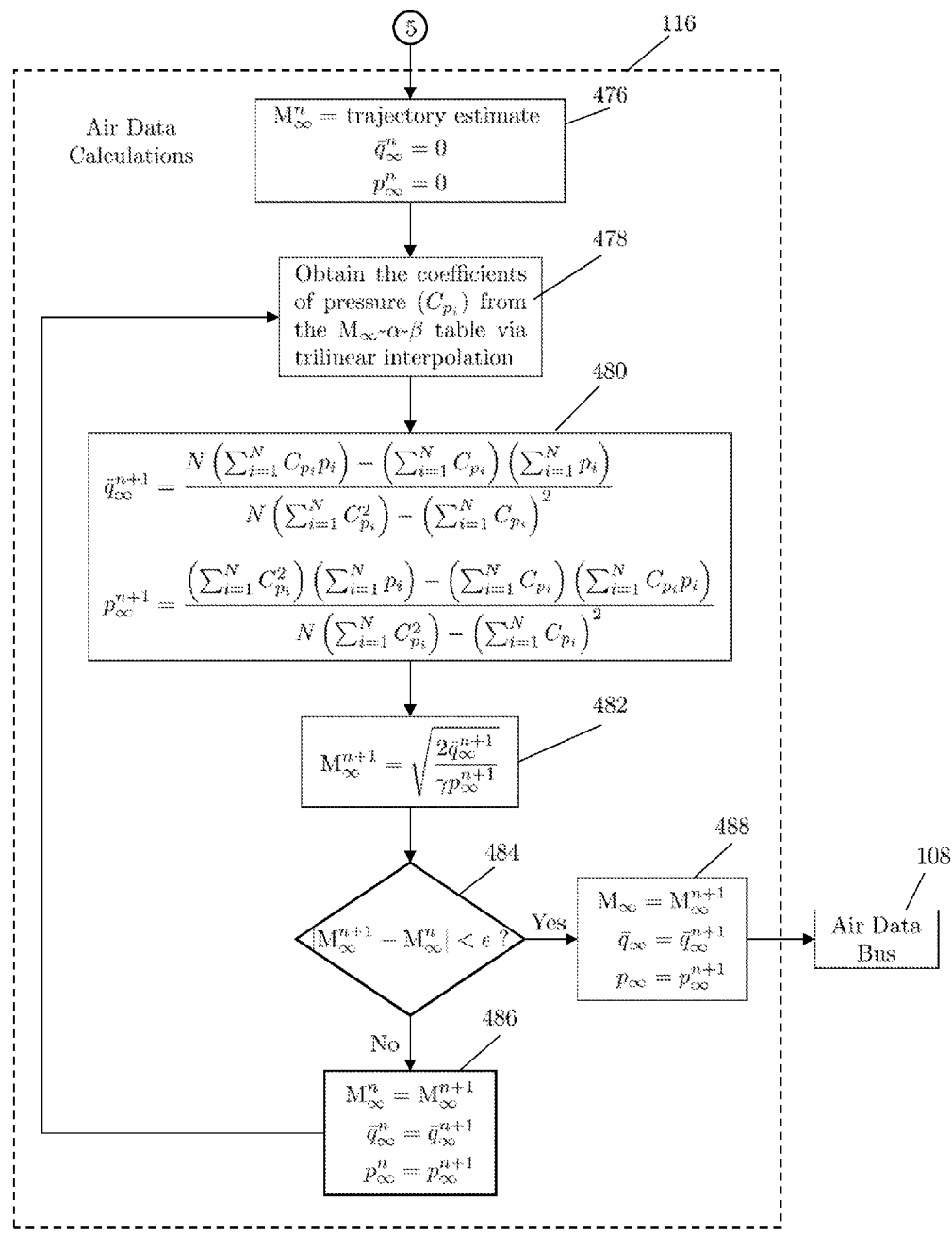

FIGS. 4A-4C show the steps performed by the preprocessor 114 in order to determine one or more angle of attack values and one or more sideslip angles in greater detail than FIG. 3. FIG. 4D shows steps performed by the air data processor 116 to estimate air data parameters based on the angle of attack and sideslip angle values determined by the preprocessor 114.

The present disclosure includes a method for guiding a vehicle 100 that includes at least four surface-mounted pressure sensors 122 mounted on the vehicle 100 and the air data estimation controller 102 connected to each of the plurality of surface-mounted pressure sensors 122. The air data estimation controller 102 includes the preprocessor 114 and the air data processor 116. The method can include detecting, by each surface-mounted pressure sensor 122, a surface pressure distribution for a location of each such sensor 122 on the vehicle 100. The method can include setting, by the preprocessor 114, an initial value for angle of attack $\alpha_1$ of the vehicle 100 and an initial value for sideslip angle $\beta$ of the vehicle 100. See step 404 of FIG. 4A. In an exemplary embodiment, the initial value for angle of attack is set to zero. In an exemplary embodiment, the initial value for sideslip angle is set to zero.

Step 404 of FIG. 4A corresponds to steps 300 and 302 in FIG. 3. Additionally, in step 404 of FIG. 4A, an iterate value for the angle of attack $\alpha^n$ is set. This initial iterate value will differ from the set value (e.g., initial guess) for the angle of attack as the solution proceeds.

The method for guiding the vehicle 100 can include receiving, in the preprocessor 114, surface pressure distribution values (e.g., $p_i$, $p_j$, $p_k$) of one or more first sets of three surface-mounted pressure sensors 122, each first set of three surface-mounted pressure sensors are located among three different geometric planes that are parallel to the ground. See step 400 of FIG. 4A. In an exemplary embodiment, the first set of three surface mounted sensors 122 are located among two different geometric planes that are parallel to the ground. In step 400 of FIG. 4A, three surface pressure distribution values $p_i$, $p_1$, $p_k$ are selected from the pressure measurement bus 104 (i.e., from among pressure measurements $p_1$, $p_2$, ..., $p_N$), with the three surface-mounted pressure sensors 122 associated with the three surface pressure distribution values each being located in different x-y planes. Next, the three pressure measurements are differenced as indicated in step 402.

The method for guiding the vehicle 100 can include determining, by the preprocessor 114, a converged value for the angle of attack (e.g., $\bar{\alpha}$) using the initial value for angle of attack $\alpha_1$, the initial value for sideslip angle $\beta$, and the surface pressure distribution values of the one or more first sets of three surface-mounted pressure sensors 122. In step 406 of FIG. 4A, with the sideslip angle $\beta$ and the positions of the surface-mounted pressure sensors, a first set of parameters $a_{i,j,k}$, $b_{i,j,k}$, and $c_{i,j,k}$, are computed. In step 408, from the first set of parameters $a_{i,j,k}$, $b_{i,j,k}$, and $c_{i,j,k}$, a second set of parameters $A_{i,j,k}$, $B_{i,j,k}$, $C_{i,j,k}$, $D_{i,j,k}$, and $E_{i,j,k}$ are computed. In step 410, the second set of parameters $A_{i,j,k}$, $B_{i,j,k}$, $C_{i,j,k}$, $D_{i,j,k}$, and $E_{i,j,k}$, are used with the pressure differences $P_{ik}$, $P_{ji}$, and $P_{kj}$ to obtain the coefficients of a fourth order trigonometric polynomial. After step 410, iterations for the angle of attack are performed. Step 412 is performed only if a new iteration for the angle of attack is required. In step 412, the iterate value for the angle of attack $\alpha^n$ is set as the initial value for the angle of attack $\alpha_1$. Step 400 can be re-entered if a new set of pressure differences are required without a change in sideslip angle (see the circled number 2 in FIG. 4A), or if the sideslip angle has been updated and a whole new set of iterations are begun for the angle of attack (see the circled number 4 in FIG. 4A).

FIG. 4B illustrates steps that are performed by the preprocessor 114 to determine one or more angle of attack values. In step 414, the functions f and the derivative of f are computed in order to begin the Newton-Raphson iterations in step 416. In step 418, if it is determined that the iterates $\alpha^{n+1}$ and $\alpha^n$ have not converged, a check is made in step 424 to ensure that the new iterate $\alpha^{n+1}$ is a number. If $\alpha^{n+1}$ is a number, in step 426 it is checked to ensure that $\alpha^{n+1}$ lies in a logical quadrant. In step 428, the new iterate $\alpha^{n+1}$ is used to update function f and the derivative of function f until convergence of the angle of attack value. In step 424, if the new iterate $\alpha^{n+1}$ is not a number, the process moves to another set of three pressure values that also satisfy the condition that the three surface-mounted pressure sensors 122 are located among at least two geometric planes that are parallel to the ground (step 430). In step 418, if the iterates $\alpha^{n+1}$ and $\alpha^n$ have converged, the converged value is saved in steps 420 and 422, and the next set of three pressure values that also satisfy the condition that the three surface-mounted pressure sensors 122 are located among at least two geometric planes that are parallel to the ground are used (step 430). In step 432, the last converged value is used on subsequent iterations to speed convergence. When computations with the last set of three pressure values that satisfy the condition that the three surface-mounted pressure sensors 122 are located among at least two geometric planes that are parallel to the ground are complete, all valid values of the angles of attack are averaged to produce the new angle of attack (step 434). In step 436, if the averaged angle of attack $\bar{\alpha}$ matches the last guess, all iterations are complete (step 440), and both the angle of attack ($\overline{\alpha=\alpha}$) and sideslip angle 13 are outputted from the preprocessor 114 to the air data processor 116 (see the circled number five in FIG. 4B). The angle of attack value in step 440 is the converged value of the angle of attack ($\bar{\alpha}=\alpha$). In step 436, if the equality is not true, a new sideslip angle ($\alpha_1=\bar{\alpha}$) is required to start the iterations over again. In step 438, the initial value (e.g., a guess) for the angle of attack $\alpha_1$ is updated to the value of the averaged angle of attack $\bar{\alpha}$, and a new value for the sideslip angle is computed (3). This entire process of FIG. 4B corresponds to steps 304, 306, 308, and 310 in FIG. 3.

In an exemplary embodiment, the preprocessor 114 is configured to determine that the converged value for the angle of attack is a value to be outputted by the preprocessor 114 when a difference of the converged value for the angle of attack ($\alpha_1=\bar{a}$) and the preceding value for the angle of attack $\alpha_1$ is less than a predetermined tolerance value $\varepsilon$ (see step 436).

In an exemplary embodiment, the preprocessor 114 is configured to determine a plurality of iterate values for the angle of attack (e.g., $\alpha^n$, $\alpha^{n+1}$, etc.), and updates the initial value for sideslip angle $\alpha_1$ each time an iterate value for the angle of attack is determined until the converged value for the angle of attack ($\alpha_1=\bar{\alpha}$) is obtained (see, e.g., step 412).

FIG. 4C illustrates steps that are performed to determine a sideslip angle value $\beta$. In an exemplary embodiment, iteration is not used to determine the sideslip angle value $\beta$. The method for guiding the vehicle 100 can include receiving, in the preprocessor 114, surface pressure distribution values of one or more second sets of three surface-mounted pressure sensors 122, each second set of three surface-mounted pressure sensors 122 are located among three different geometric planes that are perpendicular to the ground. That is, the three surface-mounted pressure sensors in the second set are selected so that they are located in three different x-z planes (see step 442). In an exemplary embodiment, the second set of three surface-mounted pressure sensors 122 are located among two different geometric planes that are perpendicular to the ground. The first and second sets of pressure sensors 122 differ by at least one pressure sensor 122.

The method for guiding the vehicle 100 can include determining, by the preprocessor 114, a converged sideslip angle value based on the converged value for the angle of attack ($\bar{\alpha}$ which is set to $\alpha_1$ in step 438) and the surface pressure distribution values of the one or more second sets of three surface-mounted pressure sensors 122. In step 444, the surface pressure distribution values of the one or more second sets of three surface-mounted pressure sensors are differenced as in step 402 of FIG. 4A.

In step 446, parameters $A_{i,j,k}$ and $B_{i,j,k}$ are determined based on the current value for the angle of attack obtained from the steps of FIG. 4A ($\alpha_1$ from step 438), and the pressure differences of step 444. In step 448, coefficients $\hat{c}_0$, $\hat{c}_1$, $\hat{c}_2$ for a quadratic trigonometric polynomial are obtained based on the pressure differences $P_{ik}$, $P_{ji}$, $P_{kj}$ and parameters $A_{i,j,k}$ and $B_{i,j,k}$. In the unlikely event that the two higher order coefficients $\hat{c}_1, \hat{c}_2$ are both zero (step 450), the sideslip angle value $\beta$ is set to zero in step 452. In the other unlikely event that the highest order coefficient $\hat{c}_2$ is zero (step 454), the polynomial becomes linear and the root is explicitly given in step 456. For the more common case, two roots are determined (step 458), and the root closest to zero (step 460) is selected as the desired value (step 462 or step 464). If at any point, the sideslip angle value is not a number (step 466), this value for the sideslip angle is discarded, and the next set of three surface-mounted pressure sensors is selected (step 470). If, the sideslip angle value is a number, the value of the sideslip angle is saved in a memory (step 468) and the next set of three surface-mounted pressure sensors that satisfy the condition that the three surface-mounted pressure sensors 122 are located among three different geometric planes that are perpendicular to the ground is selected (470). Once all the sets of three surface-mounted pressure sensors that satisfy the condition that the three surface-mounted pressure sensors 122 are located among three different geometric planes that are perpendicular to the ground have been exhausted, the sideslip angles that are determined are averaged to provide a new sideslip angle value (step 472). The iterations for the angle of attack begin anew with the new value of the sideslip angle $\bar{\beta}$, that is set as $\beta$ in step 474 (see the circled number 4 in FIG. 4C). The steps in FIG. 4C correspond to step 312 in FIG. 3.

The method for guiding the vehicle 100 can include outputting the converged value for the angle of attack and the converged sideslip angle value from the preprocessor 114 to the air data processor 116.

The method for guiding the vehicle 100 can include estimating, by the air data processor 116, air data parameters based on the converged value for the angle of attack and the converged sideslip angle value determined by the preprocessor 114.

In an exemplary embodiment of the method, the initial value for angle of attack is set to a value obtained from a previously converged angle of attack solution produced by the preprocessor 114 or an input to the preprocessor 114 that represents a predicted trajectory of a vehicle 100.

In an exemplary embodiment of the method, the converged value for the angle of attack is an average of angle of attack values previously determined by the preprocessor 114.

In an exemplary embodiment of the method, the converged sideslip angle value is an average of sideslip angle values previously determined by the preprocessor 114.

In an exemplary embodiment of the method, the preprocessor 114 determines that the converged value for the angle of attack is a value to be outputted by the preprocessor 114 when a difference of the converged value for the angle of attack ($\alpha_1=\bar{a}$) and the preceding value for the angle of attack $\alpha_1$ is less than a predetermined tolerance value $\varepsilon$.

In an exemplary embodiment of the method, the preprocessor 114 determines a plurality of iterate values for the angle of attack (e.g., $\alpha^n$, $\alpha^{n+1}$, etc.), and updates the initial value for sideslip angle $\alpha_1$ each time an iterate value for the angle of attack is determined until the converged value for the angle of attack ($\alpha_1=\bar{\alpha}$) is obtained.

FIG. 4D illustrates steps that are performed by the air data processor 116 to determine the air data parameters. In step 476, an initial value for the Mach number is determined based on a preplanned trajectory of the vehicle 100. In step 478, with the angle of attack $\alpha$ and sideslip angles $\beta$ computed in the preprocessor 114, an estimate of the coefficient of pressures at each of the surface-mounted pressure sensor locations is made based on a Mach number, angle of attack, and sideslip table stored in the database 118 and a trilinear interpolation. In step 480, a new freestream pressure and freestream dynamic pressure are computed. In step 482, a new Mach number is calculated (step 486). In step 484, if the new Mach number does not equal the old Mach number, the new Mach number is used to obtain new coefficients of pressures (step 478), and iteration continues until there is convergence of the Mach number (step 484). In step 488, once the Mach number converges, one or more flight parameters are outputted to the air data bus 108.

The method for guiding the vehicle 100 can include outputting the estimated air data parameters from the air data processor 116 to the flight control processor 110.

The method for guiding the vehicle 100 can include providing, from the flight control processor 110, an output for adjusting an orientation of the vehicle 100 based on the estimated air data parameters to the vehicle control system 120.

A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

The air data estimation controller 102 and the flight control processor 110 as discussed herein may be a single hardware processor, a plurality of hardware processors, or combinations thereof. Hardware processor devices may have one or more processor "cores." The term "database" as discussed herein is used to generally refer to tangible media such as a memory device.

Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

The air data estimation controller 102 and the flight control processor 110 may be special purpose or general purpose hardware processor devices. The air data estimation controller 102 may be connected to a communication infrastructure, such as a bus, message queue, network, multi-core message-passing scheme, etc. The network may be any network suitable for performing the functions as disclosed herein and may include a wireless network (e.g., Wi-Fi), a mobile communication network, a satellite network, fiber optic, coaxial cable, infrared, radio frequency (RF), or any combination thereof. Other suitable network types and configurations will be apparent to persons having skill in the relevant art. The air data estimation controller 102 may also include a memory (e.g., random access memory, read-only memory, etc.). The memory may be read from and/or written to in a well-known manner. In an embodiment, the memory may be non-transitory computer readable recording media.

Data stored in the air data estimation controller 102 (e.g., in the database 118) may be stored on any type of suitable computer readable media, such as optical storage (e.g., a compact disc, digital versatile disc, Blu-ray disc, etc.), magnetic tape storage (e.g., a hard disk drive), or solid-state drive. An operating system can be stored in the database 118.

In an exemplary embodiment, the data may be configured in any type of suitable database configuration, such as a relational database, a structured query language (SQL) database, a distributed database, an object database, etc. Suitable configurations and storage types will be apparent to persons having skill in the relevant art.

The air data estimation controller 102 may also include a communications interface. The communications interface may be configured to allow software and data to be transferred between the air data estimation controller 102 and external devices. Exemplary communications interfaces may include a modem, a network interface (e.g., an Ethernet card), a communications port, a PCMCIA slot and card, etc. Software and data transferred via the communications interface may be in the form of signals, which may be electronic, electromagnetic, optical, or other signals as will be apparent to persons having skill in the relevant art. The signals may travel via a communications path, which may be configured to carry the signals and may be implemented using wire, cable, fiber optics, a cellular phone link, a radio frequency link, etc.

Computer programs (e.g., computer control logic) may be stored in one or more on-board memory devices. Computer programs may also be received via the communications interface. Such computer programs, when executed, may enable the air data estimation controller 102 to implement the present methods as discussed herein. In particular, the computer programs, when executed, may enable air data estimation controller 102 to implement the methods illustrated by FIGS. 3 and 4A-4D, or similar methods, as discussed herein. Where the present disclosure is implemented using software, the software may be stored in a computer program product or non-transitory computer readable medium and loaded into the air data estimation controller 102 using a removable storage drive or communications interface.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A vehicle guidance system, comprising:
   a body of a vehicle;
   at least four surface-mounted pressure sensors configured to be mounted on the body of the vehicle, each sensor being configured to detect a surface pressure distribution for a location of each such sensor when placed on the vehicle;
   an air data estimation controller connected to each of the plurality of surface-mounted pressure sensors, the air data estimation controller including:
      a preprocessor configured to:
         set an initial value for angle of attack and set an initial value for sideslip angle, and determine a converged value for the angle of attack by iteration using the initial value for angle of attack, the initial value for sideslip angle, and surface pressure distribution values of one or more first sets of three surface-mounted pressure sensors, each first set of three-surface mounted pressure sensors are located among three different geometric planes that are parallel to the ground, and
         provide a converged sideslip angle value by iteration based on the converged value for the angle of attack and surface pressure distribution values of one or more second sets of three surface-mounted pressure sensors, each second set of three-surface mounted pressure sensors are located among three different geometric planes that are perpendicular to the ground, wherein the first and second sets of pressure sensors differ by at least one pressure sensor and all pressure sensors comprising the first and second sets of pressure sensors are positioned on the vehicle body in a non-cruciform manner, and an air data processor configured to estimate air data parameters based on the converged value for the angle of attack and the converged sideslip angle value;

a flight control processor configured to provide an output for adjusting an orientation of the vehicle based on the estimated air data parameters; and a vehicle control system configured to receive the output of the flight control processor of the vehicle guidance system for altering the orientation of the vehicle.

2. The vehicle guidance system of claim 1, wherein the preprocessor is configured to set the initial value for angle of attack to zero.

3. The vehicle guidance system of claim 2, wherein the preprocessor is configured to set the initial value for sideslip angle to zero.

4. The vehicle guidance system of claim 1, wherein the converged value for the angle of attack is an average of angle of attack values previously determined by the preprocessor.

5. The vehicle guidance system of claim 1, wherein the converged sideslip angle value is an average of sideslip angle values previously determined by the preprocessor.

6. The vehicle guidance system of claim 1, wherein the preprocessor is configured to set the initial value for angle of attack to a value obtained from an input to the preprocessor that represents a predicted trajectory of the vehicle.

7. The vehicle guidance system of claim 1, wherein the preprocessor is configured to determine that the converged value for the angle of attack is a value to be outputted by the preprocessor when a difference of the converged value for the angle of attack and the preceding value for the angle of attack is less than a predetermined tolerance value.

8. The vehicle guidance system of claim 1, wherein the preprocessor is configured to determine a plurality of iterate values for the angle of attack, and the preprocessor is configured to update the initial value for sideslip angle each time an iterate value for the angle of attack is determined until the converged value for the angle of attack is obtained.

9. The vehicle guidance system of claim 1, wherein no surface-mounted pressure sensors are located on a vertical meridian of the vehicle.

10. The vehicle guidance system of claim 1, wherein at least four surface-mounted pressure sensors are not located on a vertical meridian of the vehicle.

11. The vehicle guidance system of claim 1, wherein iteration for the angle of attack is coupled with iteration for the sideslip angle.

12. The vehicle guidance system of claim 1, wherein the set initial value for sideslip angle is a converged sideslip angle that was previously determined.

13. A method for guiding a vehicle that includes at least four surface-mounted pressure sensors mounted on the vehicle and an air data estimation controller connected to each of the plurality of surface-mounted pressure sensors, wherein the air data estimation controller includes a preprocessor and an air data processor, the method comprising:

detecting, by each sensor, a surface pressure distribution for a location of each such sensor on the vehicle;

setting, by the preprocessor, an initial value for angle of attack of the vehicle and an initial value for sideslip angle of the vehicle;

receiving, in the preprocessor, surface pressure distribution values of one or more first sets of three surface-mounted pressure sensors, each first set of three surface-mounted pressure sensors are located among three different geometric planes that are parallel to the ground;

determining, by the preprocessor, a converged value for the angle of attack by iteration using the initial value for angle of attack, the initial value for sideslip angle, and the surface pressure distribution values of the one or more first sets of three surface-mounted pressure sensors;

receiving, in the preprocessor, surface pressure distribution values of one or more second sets of three surface-mounted pressure sensors, each second set of three surface-mounted pressure sensors are located among three different geometric planes that are perpendicular to the ground, wherein the first and second sets of pressure sensors differ by at least one pressure sensor and all pressure sensors comprising the first and second sets of pressure sensors are positioned on the vehicle in a non-cruciform manner;

determining, by the preprocessor, a converged sideslip angle value by iteration based on the converged value for the angle of attack and the surface pressure distribution values of the one or more second sets of three surface- mounted pressure sensors;

outputting the converged value for the angle of attack and the converged sideslip angle value from the preprocessor to the air data processor;

estimating, by the air data processor, air data parameters based on the converged value for the angle of attack and the converged sideslip angle value; outputting the estimated air data parameters from the air data processor to a flight control processor; and providing, from the flight control processor, an output for adjusting an orientation of the vehicle based on the estimated air data parameters to a vehicle control system.

14. The method of claim 13, wherein the initial value for angle of attack is set to zero.

15. The method of claim 14, wherein the initial value for sideslip angle is set to zero.

16. The method of claim 13, wherein the converged value for the angle of attack is an average of angle of attack values previously determined by the preprocessor.

17. The method of claim 13, wherein the converged sideslip angle value is an average of sideslip angle values previously determined by the preprocessor.

18. The method of claim 13, wherein the initial value for angle of attack is set to a value obtained from a previously converged angle of attack solution produced by the preprocessor or an input to the preprocessor that represents a predicted trajectory of the vehicle.

19. The method of claim 13, wherein the preprocessor determines that the converged value for the angle of attack is a value to be outputted by the preprocessor when a difference of the converged value for the angle of attack and the preceding value for the angle of attack is less than a predetermined tolerance value.

20. The method of claim 13, wherein the preprocessor determines a plurality of iterate values for the angle of attack, and updates the initial value for sideslip angle each time an iterate value for the angle of attack is determined until the converged value for the angle of attack is obtained.

* * * * *